United States Patent [19]
Hunts

[11] Patent Number: 5,231,762
[45] Date of Patent: Aug. 3, 1993

[54] GROOMING ATTACHMENT FOR VACUUM-DRAWN CLIPPERS

[76] Inventor: Rick E. Hunts, 6650 Lusk Blvd., #B-100, San Diego, Calif. 92121

[21] Appl. No.: 897,921

[22] Filed: Jun. 15, 1992

[51] Int. Cl.⁵ .................. B26B 41/42; B26B 21/00
[52] U.S. Cl. ........................................ 30/133; 30/132
[58] Field of Search ............... 30/133, 132, 201, 220, 30/132

[56] References Cited

U.S. PATENT DOCUMENTS

| | | | |
|---|---|---|---|
| D. 311,615 | 10/1990 | Hunts | D32/32 |
| 3,344,520 | 10/1067 | Williams | 30/133 |
| 3,654,699 | 4/1972 | Garcia | 30/133 |
| 4,679,322 | 7/1987 | Hunts | 30/133 |
| 4,704,794 | 11/1987 | Paradis | 30/133 |
| 4,970,788 | 11/1990 | Hunts | 30/133 |
| 5,084,973 | 2/1992 | Geer | 30/133 |

*Primary Examiner*—Frank T. Yost
*Assistant Examiner*—Paul M. Heyrana
*Attorney, Agent, or Firm*—Henri J. A. Charmasson

[57] ABSTRACT

A dog grooming attachment to a haircutting tool of the type that uses hair flow created by suction device to draw hair into a cutting chamber comprises a spacing element attachable to the inlet of the cutting chamber and a comb made of a plurality of parallel, L-shaped tines.

2 Claims, 1 Drawing Sheet

GROOMING ATTACHMENT FOR VACUUM-DRAWN CLIPPERS

Field of the Invention

This invention relates to haircutting tools and more particularly to motor-driven clippers which suction devices such as vacuum cleaners, wherein the air flow is used to draw the hair to a convenient cutting position and to efficiently evacuate the clippings.

BACKGROUND OF THE INVENTION

Hair clippers using vacuum suction to draw and position the hair to a convenient clipping position such as the one disclosed in my U.S. Pat. Nos. 4,679,322, 4,970,788, 311,616 are commonly used to cut and style human hair. It would be advantageous to use the same type of device in clipping and grooming dogs. However, due to their thickness, density and kinkiness most dog furs do not lend themselves to the use of such hair clipping devices. Intensive preliminary combing of the fur is often necessary before the hair can be conveniently drawn into the cutting chamber of the clippers.

SUMMARY OF THE INVENTION

The principal and secondary objects of this invention are to provide a means for using the haircutting tools which uses vacuum suction to draw the hair to be cut into a flow chamber to a convenient cutting position when cutting or grooming thick hairdos, beards and animal furs;

to provide a convenient way to space the clipper steady and regular cutting distance from the skin; and to minimize or suppress any preliminary combing of the hair or fur to be clipped.

These and other objects are achieved by means of an attachment to the opening of the cutting chamber of a vacuum-backed hair clipper. The attachment has a plurality of parallel L-shaped tines forming a horizontal comb at a convenient distance from the cutting chamber opening.

DESCRIPTION OF THE PREFERRED EMBODIMENTS OF THE INVENTION

Figure 1:
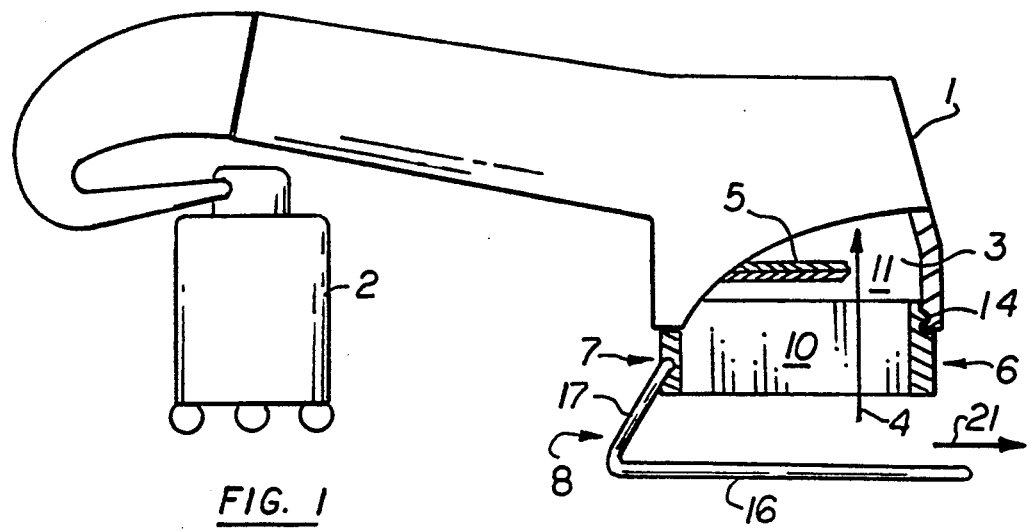
FIG. 1 is a side view of a vacuum-backed hair clipper equipped with the dog grooming attachment with a partial cut-out exposing the structure of the attachment.
Figure 2:
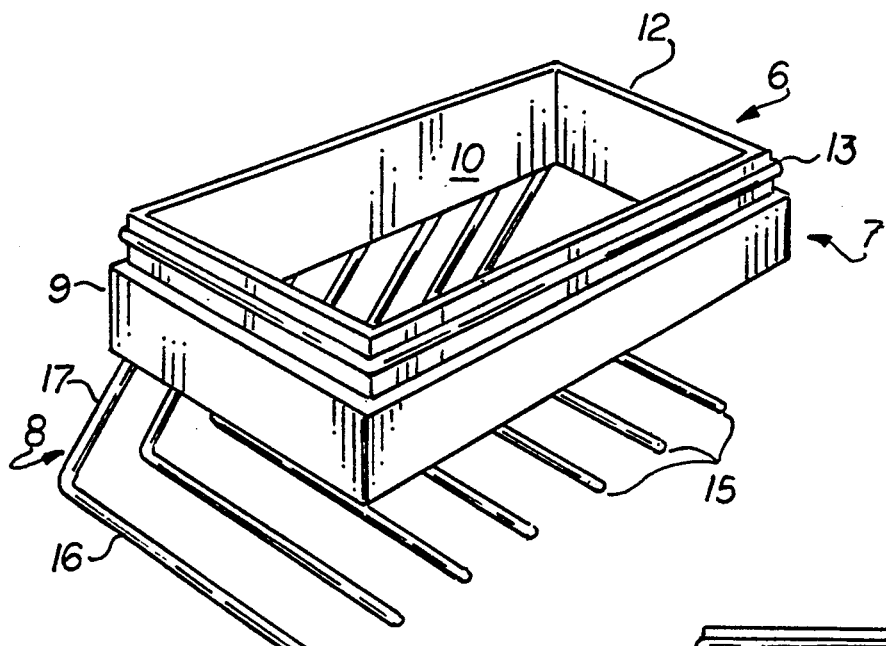
FIG. 2 is a perspective view of a dog grooming attachment.

Referring now to the drawing there is shown in FIG. 1 a haircutting device 1 of the type that uses vacuum generated by a vacuum cleaner 2 or other suction device to create an air flow into the cutting or flow chamber 3 of the tool in order to draw the hair into a convenient axial cutting position indicated by the arrow 4 where it can be conveniently cut by a set of blades 5 operating in the opening of the cutting chamber 3. The haircutting tool 1 may be motor-driven as the one disclosed in my U.S. Pat. No. 4,679,322, or may use a conventional pair of scissors as disclosed in my U.S. Pat. No. 4,970,788. The haircutting tool, is equipped with a dog grooming attachment 6 which comprises a spacing element 7 and a combing element 8. The spacing element consists of a frame 9 forming an internal channel 10 and having a geometry substantially symmetrical with the inlet of flow chamber 3. The upper rim 12 of the spacing element snaps into the inlet rim of the flow chamber and is retained therein by a peripheral rib 13 on the spacing element engaging a groove 14 in the inner periphery of the chamber inlet 11.

The combing element consists of a set of parallel and symmetrical tines 15. Each tine has a distal linear segment 16 which runs perpendicular to the haircutting position 4 and at a specific distance from the spacing element, and a proximal segment 16 into rigid contact and attachment with the spacing element 7. Each tine is preferably made of a slightly resiliently flexible material such as steel.

Figure 3:
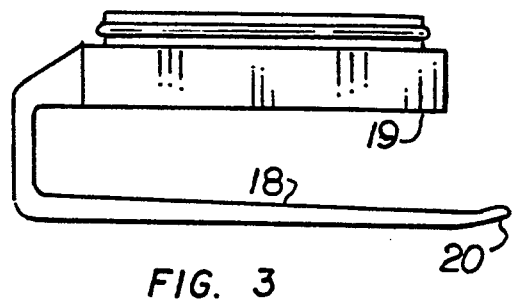
FIG. 3 is a side view of an alternate embodiment of the dog grooming attachment.

FIG. 3 illustrates an alternate treatment of the tines 18 which in this case are made of plastic and molded integrally with the spacing element 19. In this embodiment the tines 18 are further characterized by a slightly upward curved tip 20 in order to prevent accidental penetration into the flesh of the animal. The cutting tool and attachment are designed to be used by pushing forward in the direction illustrated by arrow 21.

While the preferred embodiments of the invention have been described, modifications can be made and other devised without departing from the spirit of the invention and the scope of the appended claims.

What is claimed is:

1. The combination of a haircutting tool wherein an air-created by a suction device associated with the tool is used to draw hair through the orifice of a flow chamber to a convenient axial cutting position, and to evacuate hair clippings; and a hair-combining and spacing device, said device comprising:
   a spacing element defining a channel and having an upper rim attachable to said orifice; and
   a combing element comprising a plurality of parallel and symmetrical tines extending from a lower rim of said spacing element opposite said upper rim;
   wherein each of said tines has a distal segment extending apart from said lower rim perpendicularly to said axial cutting position; and
   a proximal segment extending integrally and substantially perpendicularly from said first segment into contact with a side of said lower rim.

2. The combination of claim 1, wherein each of said tines is resiliently flexible.